April 15, 1958 — W. E. BELLER — 2,830,765

MIXING VALVE

Filed Nov. 16, 1955 — 6 Sheets-Sheet 1

Inventor:
Wilbert E. Beller

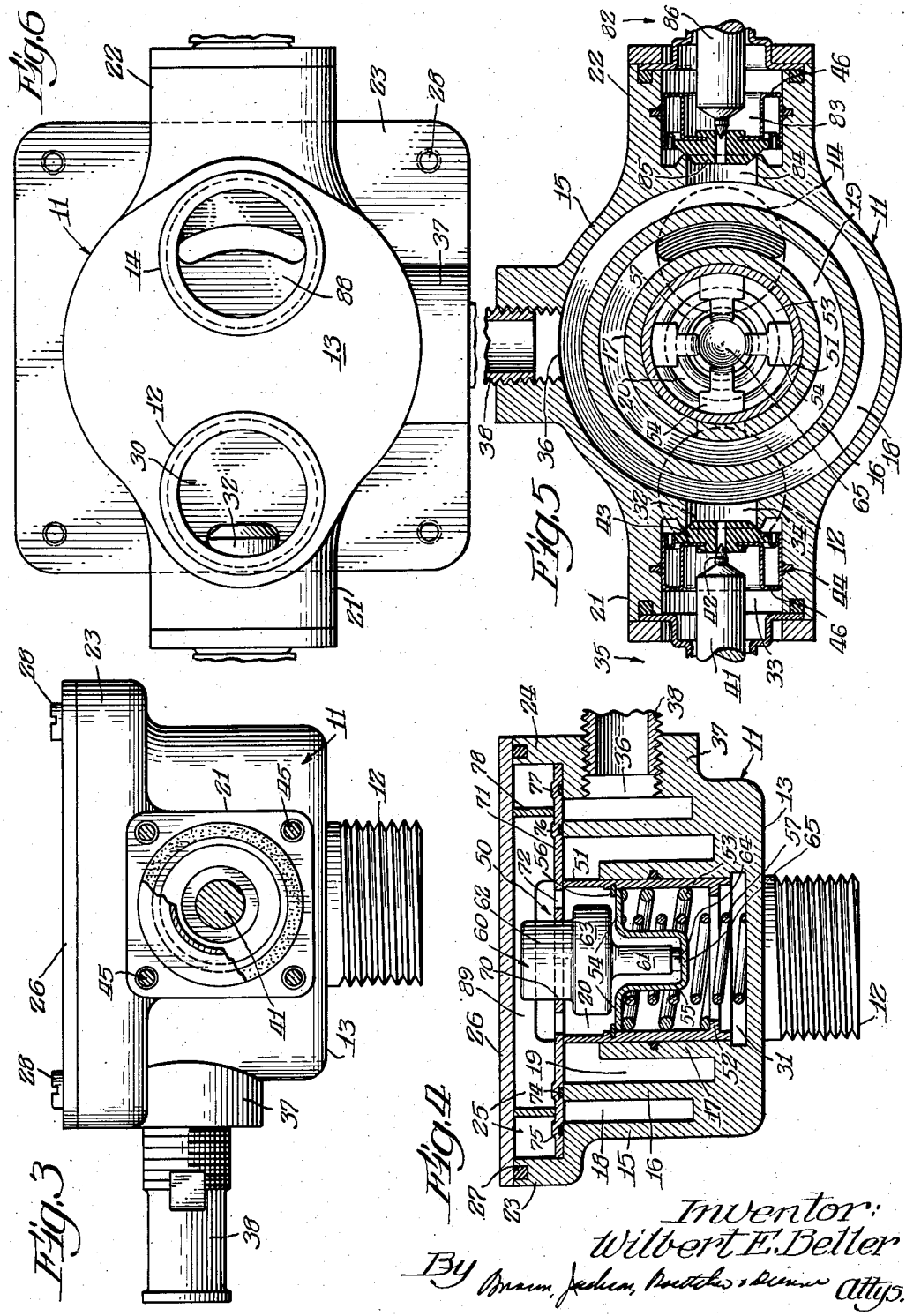

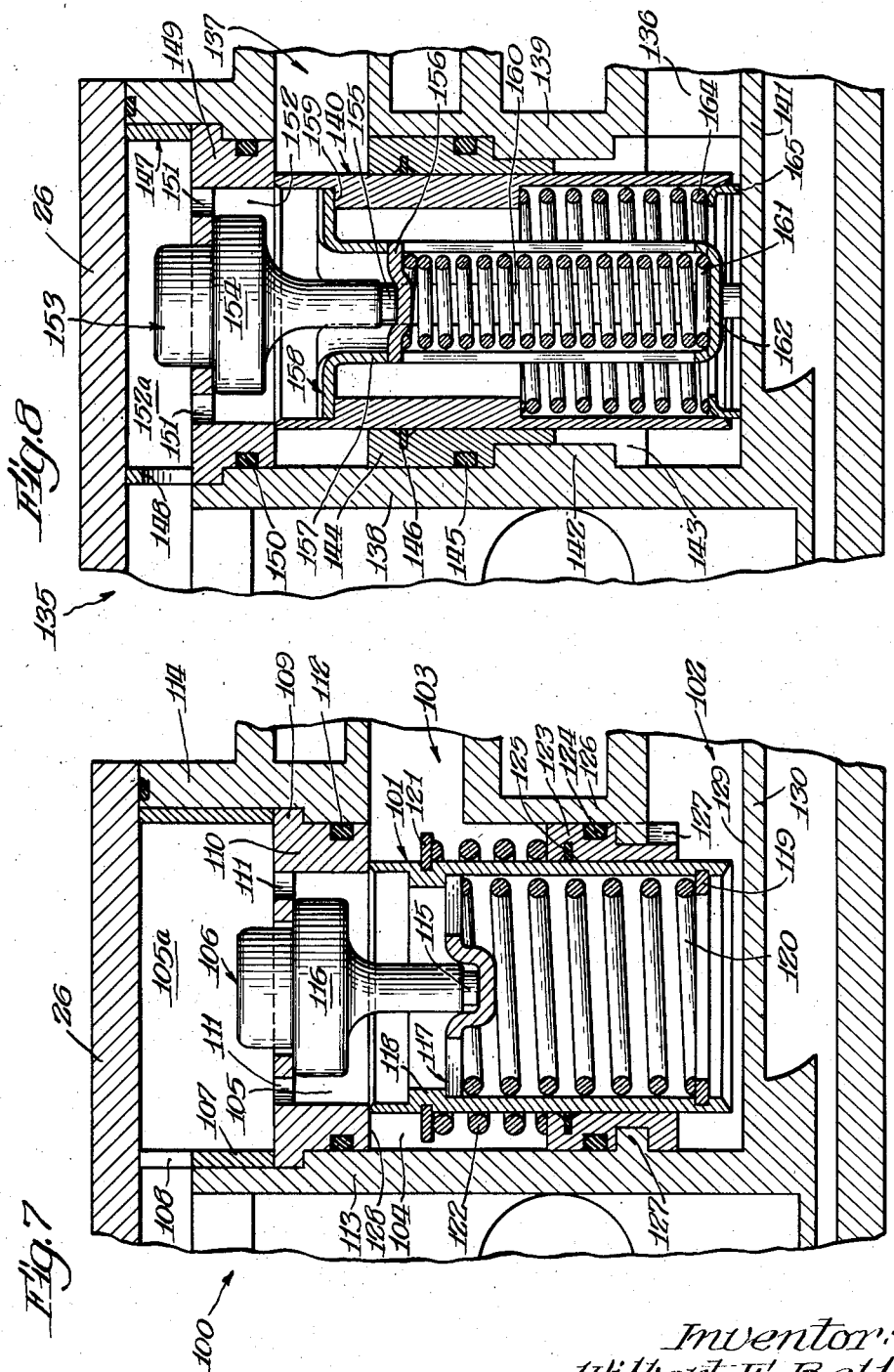

April 15, 1958 W. E. BELLER 2,830,765
MIXING VALVE
Filed Nov. 16, 1955 6 Sheets-Sheet 4

Inventor:
Wilbert E. Beller
By Brown, Jackson, Boettcher & Dienner
Attys.

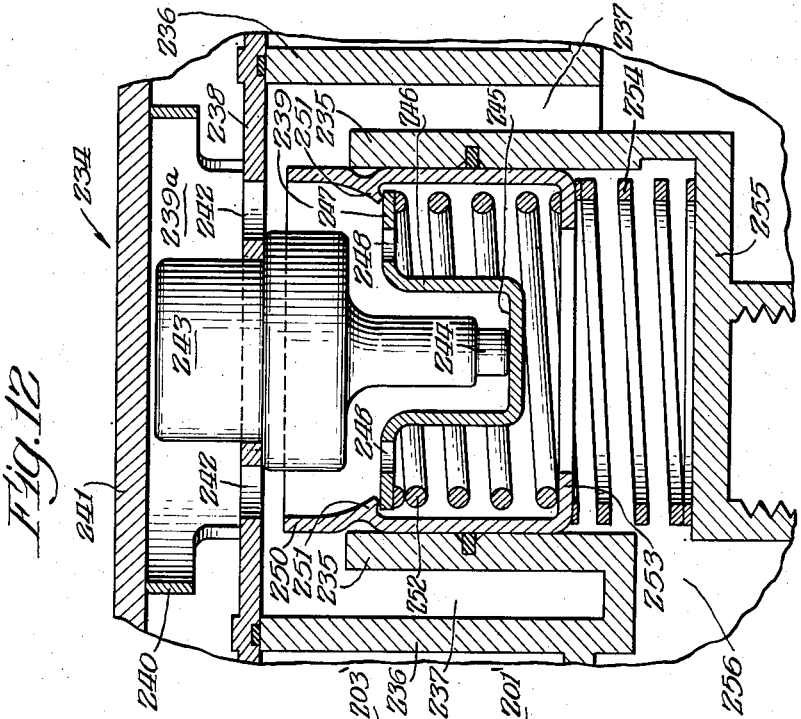
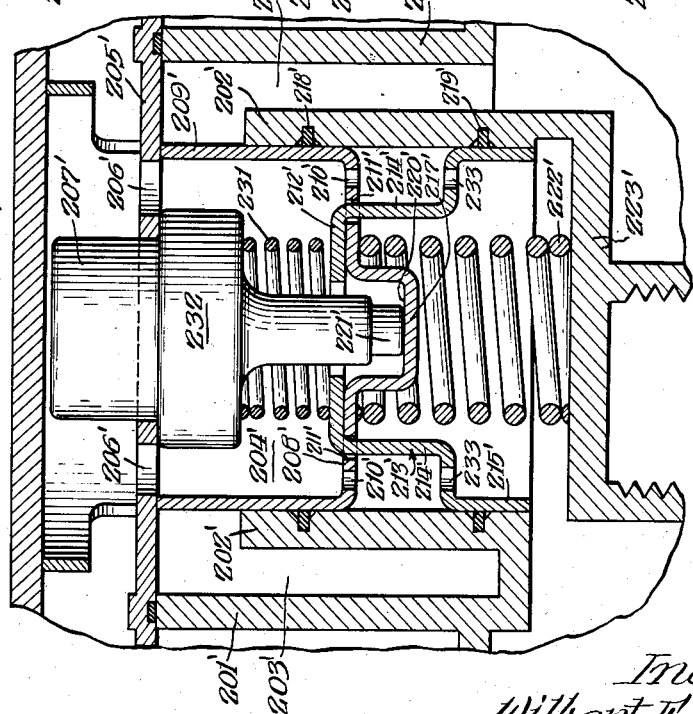

April 15, 1958     W. E. BELLER     2,830,765
MIXING VALVE
Filed Nov. 16, 1955     6 Sheets—Sheet 6
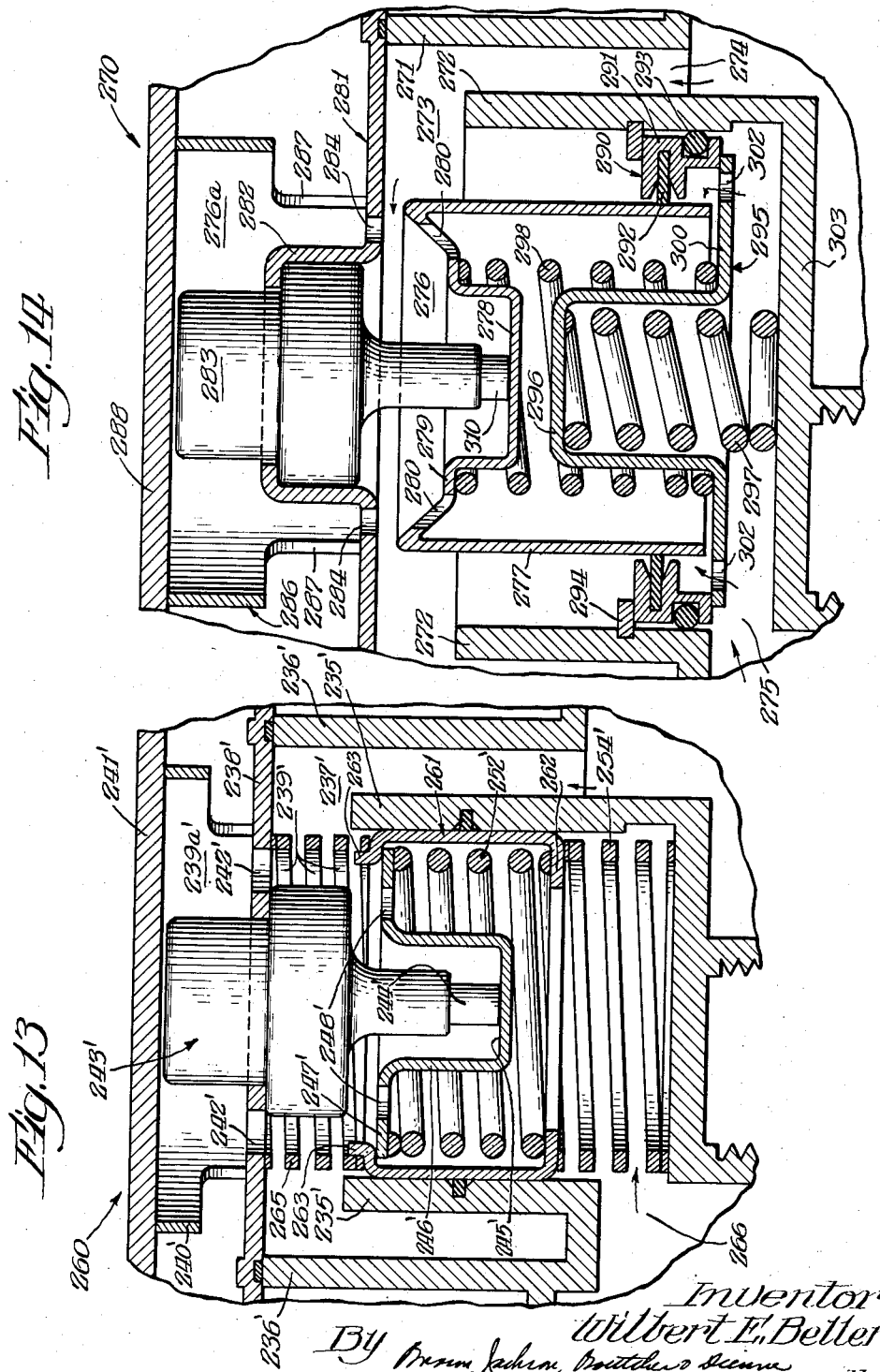
Inventor:
Wilbert E. Beller
By Brunn, Jackson, Boettcher & Dienner
Attys.

United States Patent Office 2,830,765
Patented Apr. 15, 1958

2,830,765

MIXING VALVE

Wilbert E. Beller, Park Ridge, Ill., assignor, by mesne assignments, to Controls Company of America, Schiller Park, Ill., a corporation of Delaware Application November 16, 1955, Serial No. 547,110

18 Claims. (Cl. 236—12)

This invention relates generally to valves and more particularly to thermostatically controlled mixing valves for intermixing two or more fluids of dissimilar temperature in governed amounts to achieve an intermixture of preselected temperature.

Briefly, my invention is directed to an improved thermostatic mixing valve including remotely operated pilot control valve means; there being one such pilot control means for each such mixing fluid involved, and means for discharging the fluid controlled by such pilot valves individually or simultaneously to a mixing chamber. A thermostatically operated valve means is arranged to meter the amount of such fluids introduced to the mixing chamber to achieve an intermixed product of preselected temperature. Means are also embodied in this invention for at least one of the intermixing fluids to bypass the mixing chamber, if desired, so that such fluid can pass directly through the valve to the point of utility at a substantially unaltered temperature.

The improved valve of this invention finds general utility in automatic washing machines or other devices of a like character as will be readily called to mind by those familiar in the art.

One of the principal disadvantages of valves in this class prior to my invention, resided in the complexity of their structural aspects resulting in their over sensitivity of operation as well as their inability to achieve desirable high-rate capacity per cubic inch displacement for the valve body. Other difficulties have been encountered in thermostatically controlling and operating the metering devices of such valves, so that the metering means properly evaluate and admit the correct proportion of a given temperature fluid to the mixing chamber to achieve the desired end temperatures for the mixture. This defect is largely witnessed by a tendency for present thermostatic valve means to hunt, giving the valve dynamic instability so that the measuring and flow control of the metering assembly of the valve is not positive, direct and accurate.

The valve of my invention is intended to obviate the above outlined difficulties and particularly to present marked improvements in this type of device. The valve is distinguished by a particular unique concentric labyrinth or chamber system in which fluids under pressure are introduced; the arrangement being such that the highest fluid pressures are contained in the innermost chamber of the concentric labyrinth to diminish the inherent danger of bursting the valve body by lessening the differential of pressures on opposite sides of the chamber walls. This construction also permits the reduction in wall thickness between the several chambers of the labyrinth reducing weight, cost and size for given cubic displacement. It further provides a safety factor in the event of high pressure rupture, in that the outer concentric chamber acts as a safety barrier about the high pressure internal chambers.

Other features of my device are directed to the sensing of mixed water temperatures at locations relatively close to the chamber in which such liquids are to be mixed and prior to the discharge of such mixing liquids from the mixing chamber such that the temperature may be sensed and a preliminary correction of the mixing function asserted even in circumstances where flow through the valve has ben interrupted. By this latter expedient, the valve of my invention readily compensates correctly during off-cycle operation and is less influenced by the periodic action of the pilot valve means controlling the introduction and discharge of the fluids with respect to the mixing chamber.

Additional features of my device are directed to the definition of the mixing chamber completely independent of the housing to facilitate easier assembly, cheaper manufacture and a generally more efficient device as well as easier control of flow direction as will appear presently hereinafter.

Among the objects of my invention is the provision of a new improved thermostatically operated mixing valve of simple, more economical construction and assembly.

Another object of this invention is to provide a mixing valve of the character aforesaid having a one-piece valve body construction provided with at least two fluid inlet passages for the introduction of fluids at dissimilar temperatures; the control of the intake for such fluids being through improved pilot valve mechanisms and the further control of at least a portion of one of such fluids being direct to an internally disposed mixing metering valve system.

A further object of the invention is to provide an improved mixing valve having concentric flow chambers located one within the other and offering thereby a simple molding or machining operation for manufacture of the valve body in addition to permitting an increased flow rate for given space limitations or cubic inch displacement.

Still another object of the invention, produced largely from the concentric flow passage arrangement for said valve body, is the provision of a mixing mechanism or means substantially in line with the axes of inlet passage means therefor to give rise to greater simplification in the fabrication of the valve body.

An additional object of the invention is to arrange the flow passages in the valve body such that the discharge flow chamber encircles and becomes the outside chamber of the valve body in which relatively low pressure mixed liquids are carried.

Relating to the aforesaid last-named object, the provision of the radially outermost low pressure chamber in the valve body permits the objective of providing a mixing valve of the character described in which pressure differentials between separated fluid chambers within the valve body are minimized to decrease inherent danger of bursting the valve body from internal pressures.

Still another object related to the chamber arrangement and the provision of the outermost low pressure chamber, permits carrying out the object of lessening the danger of bursting or disrupting the external walls of the valve body from external blows, shocks or like related causes.

Still another object of this invention is to provide a valve body in which the pressure differential between adjacent chambers carrying liquid under pressure is lessened substantially to permit the reduction of wall thicknesses between such chambers producing a reduction of weight, cost and size in the construction of the valve.

A still further object of this invention is to provide an improved mixing valve of the character aforesaid in which the high pressure fluids are carried within an innermost internally disposed chamber, that is, one which is not adjacent the external walls of the valve housing so that in the event a rupture occurs in such high pressure chamber, adjacent surrounding chambers will serve to contain the liquids so released.

A still further object of the invention is to provide a thermostatically operated mixing valve in which arrangement is made to locate a control device in the mixing means of the valve operated by a thermostatic element which is sensitive to introductory fluids prior to their exit from the mixing chamber thereby to insure a more positive and direct control of the temperature of the discharging fluid mixture.

An even further object of the invention is to provide a mixing valve of the type afore-described in which a mixing chamber or means is fabricated independently of the walls of the main valve body to eliminate the necessity for having such chamber formed integrally with the main valve body so that such chamber may be readily adapted and varied in size, shape and baffling arrangements for the control of the mixing function of the valve.

The above and further objects, features and advantages of this invention will be recognized by those familiar in the art and readily will be more appreciated and understood if the following description thereof is read in light of the accompanying drawings.

In the drawings:

Figure 3 is a cross-sectional view taken substantially at line 3—3 of Figure 1;

Figure 4 is a cross-sectional view taken at line 4—4 of Figure 1;

Figure 5 is a cross-sectional view at substantially line 5—5 of Figure 2 looking in the direction of the arrows thereon;

Figure 6 is a partial bottom plan showing of the valve illustrated in Figure 1 and taken substantially from vantage line 6—6 of Figure 2;

Figure 7 is a partial enlarged cross-sectional view of a first modified form of thermostatically operated mixing control valve assembly to be used in the valve of my invention;

Figure 8 is a partial enlarged cross-sectional view, similar to Figure 7, illustrating a second modified form of thermostatically actuated control valve assembly;

Figure 11 is a cross-sectional view similar to Figure 10, illustrating a fifth modified control valve assembly and particularly a modification of the Figure 10 assembly;

Figure 12 is a cross-sectional view similar to Figure 11, illustrating a sixth modified form of the control valve assembly;

Figure 13 is a cross-sectional showing similar to Figure 12, illustrating a seventh modified control valve assembly and particularly a modification of the assembly illustrated in Figure 12; and Figure 14 is still another cross-sectional showing similar to Figures 7–13, illustrating an eighth modified form of control valve assembly for use in the valve of my invention.

Figures 1, 2:
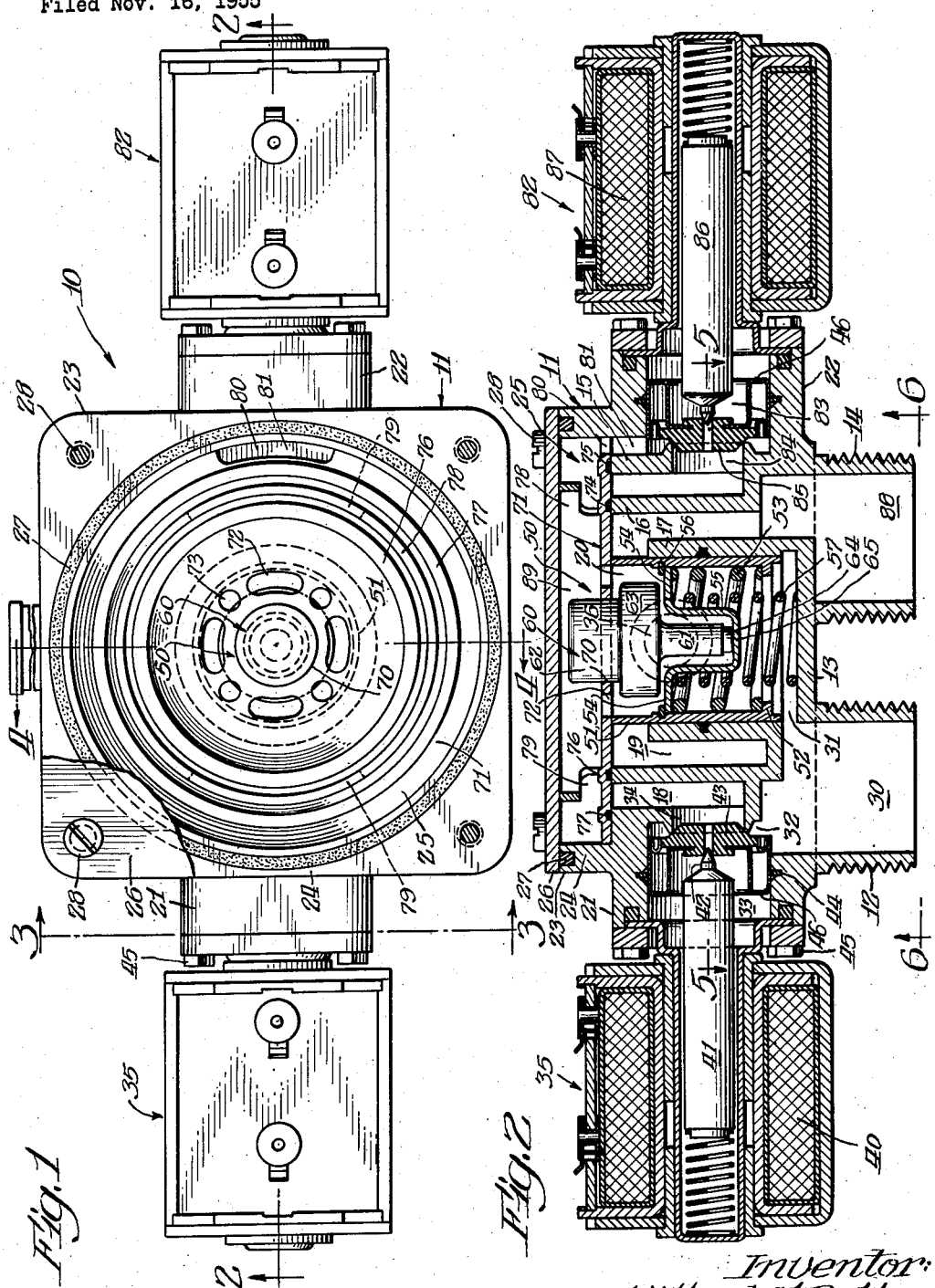
Figure 1 is a top plan view of the improved mixing valve of this invention with parts thereof, particularly a cover portion, broken away.
Figure 2 is a cross-sectional view taken substantially along the longitudinal axis of the valve illustrated in Figure 1 as at line 2—2 in that figure and looking in the direction of the arrows.

While the drawings illustrate the device and its general concepts, such has not been illustrated in conjunction with any particular apparatus, electrical source or source of pressurized fluid since such sources do not constitute portions of my invention other than as means requisite for the successful operation of this device and conventionally understood by those familiar with the art. Particularly, the mixing valve, indicated generally at 10 in Figure 1, is constructed and designed to admix hot and cold water to gain a mixed water of intermediate temperature and is likewise capable of discharging hot water directly without admixture with cold water. This type of valve has particular utility in automatic washing machines in which washing and rinsing water cycles at several preselected temperatures are required.

In the construction illustrated in Figures 1–6 of the drawings, I provide a one piece main valve body 11 having a threaded embossed portion 12 for connection with a hose or pipe coupling projecting outwardly of a lower wall 13 for the intake of hot water. A similar externally threaded boss 14 defines a cold water intake means with the two intake means 12 and 14 being in spaced side-by-side relation extending or projecting outwardly of the bottom wall 13 of housing 11. The valve body 11 is defined by a substantially cylindrical external wall 15 (see Figure 5), concentrically spaced from two additional internal walls 16 and 17 to define three concentrically related chambers; two annular chambers 18, 19 and one central cylindrical chamber 20. The body 11 is also provided with a pair of diametrically opposed cylindrical extensions 21 and 22 which lie substantially in a vertical plane with embossed portions 12 and 14, but are directed transversely thereto.

The upper end of the body member 11 is suitably flanged outwardly to define a substantially square-shaped platform portion 23, best shown in Figures 1 and 3, which is open at its upper end and invaded by a cylindrical recess having side walls 24 and defining a cylindrical chamber 25. Such chamber 25 is enclosed by side walls 24 of the recess and a cover 26 seated on the upper flat of the flange portion 23 over an annular gasket 27. Holding bolts 28 serve to fix the cover plate in position.

It will be appreciated from the foregoing that the main body member 11 is formed preferably as a casting from bronze, brass, molded nylon or like materials and is so cored as to define the several chambers described plus a suitable interconnecting passageway system as will now be set forth.

With reference now to Figures 2 and 6 of the drawings, the embossed portion 12 defines an internal chamber 30 for the intake of a first fluid, in this particular example hot water. Such chamber 30 is connected by passageway means 31 to the lower end of the innermost internal chamber 20, which defines a mixing piston cylinder as will be particularized in greater detail presently. Chamber 30 also leads by passageway means 32 directly to the hollow interior of projection portion 21 and particularly to a pilot metering chamber 33 therein. A passageway chamber 34 is formed through the side wall 15 of the casting opposite chamber 33 to communicate with the annular, outermost or discharge chamber 18. It is thus seen that hot water entering chamber 30 may flow directly into chamber 33 via passageway 32 and thus into the annular chamber 18 via passageway 34, the control of such flow being effected by the operation of a first solenoid operated pilot control valve assembly 35 mounted axially outward of the projecting portion 21 and constructed substantially in accordance with the disclosure found in my copending application Serial No. 469,207 filed November 6, 1954 for Valve Device. While the showing herein illustrates a solenoid operated pilot valve which is a preferred mode of controlling the flow of hot water through chamber 33, it is also permissible and contemplated, within the realm of this invention, that such pilot control valve means may be either mechanically or manually operable as well.

Water present in discharge chamber 18 passes through the annular course of such chamber to a discharge outlet 36, as shown best in Figure 5; such discharge outlet being defined by an internally threaded boss portion 37 formed on the rearward face of the valve body 11 as viewed in Figure 2 which receives a threaded nipple or coupler 38 as shown best in Figure 3. It will be understood that the operation of the solenoid pilot valve assembly 35 serves to control the direct flow of hot water from the inlet chamber 30 to the discharge outlet 36 via the discharge outlet 36 and the annular chamber means 18.

In general the pilot valve assembly 35 shown includes an electrically operated solenoid coil 40, a core member 41 operable in response to energization of coil 40 including needle valve portion 42 on its one end for cooperation with a resilient gasket and cage means 43 that floats reciprocally in chamber 33 past an annular O-ring seal 44. Such pilot valve assembly 35 is suitably held by bracket means (described more particularly in my above referred to application) whereby such is affixed rigidly to the outer end of the projecting portion 21 by means of bolt connectors 45 or the like. The familiar bleed openings necessary for the successful operation of this class of valve are at 46 in the gasket means 43.

As stated hereinabove, part of the hot water entering chamber 30 passes directly into chamber 18 and the remaining portion of such water is permitted to pass via passageway 31 to the lower end of the mixing valve cylinder or chamber 20. The entry of water through passage 31 is controlled by a mixing control valve assembly 50 comprising a piston valve 51 slidingly mounted in the chamber 20 defined by wall 17. Piston 51 is formed substantially as a cylindrical member having a radially inward extending skirt portion 52 near its lower end providing an internal platform support for the lower end of an override spring member 53. The upper end of spring 53 is engaged by and held beneath radially extending mounting arms 54 of a saddle member 55 having a substantially U-shaped cross section as shown clearly in Figure 4 of the drawing. Such saddle member 55 and the spring 53 are held in assembled concentricity by means of a snap ring member 56 mounted in an annular groove formed inwardly of the internal side walls of the mixing piston member 51. Surrounding the saddle member 55 in concentric manner and located radially inward of spring 53 is a second spring 57, the upper end of which engages the arm portions 54 of the saddle member. The lower end of spring 57 engages the inside face of the bottom wall 13 of the valve body 11. Such spring 57 opposes initial or normal downward movement of the mixing piston 51 as imposed by the activity of a power element type of thermostatic unit 60, known in the art. Both springs 53 and 57 in this embodiment and like springs in subsequent embodiments herein are preloaded or prestressed in assembly.

The thermostatic unit 60 has an elongated neck portion 61 and a cylindrical main body portion 62 defined and characterized especially by an enlarged section 63. Such element is responsive to thermal activity and activates substantially to elongate a movable element 64 at the lower end of the neck portion 61 thereof. The neck portion is piloted concentrically inward of the saddle member 55 so that element 64, as illustrated in Figure 4, bears against a central platform portion 65 of such saddle member.

The body portion 62 of the thermostatic element is held stationary in operation and extends through a central opening 70 of an element plate 71 with its enlarged section 63 bearing against such plate. The element plate covers the upper end of the cold water chamber 19 and discharge chamber 18 and extends over the upper end of the mixing piston chamber 20, whereat it concentrically surrounds the upwardly projecting portion 62 of the thermostatic element 60. Disposed about opening 70 in plate 71 and immediately adjacent the thermostatic element so as to communicate with chamber 20 are plural port means 72 and 73. To effect a proper seal with the upper ends of wall portions 15 and 16 of the valve body, a pair of concentric annular seal rings 74 and 75 are disposed in circular kerfs formed in the bottom face of the element plate 71. Such seal rings are designed to have pressure engagement with the upper ends of the walls 15 and 16 to effectively seal over and separate chambers 18 and 19 in the valve body. Plate 71 is also provided with a pair of concentric annular projections 76 and 77 which extend outwardly of the upper face thereon substantially opposite the kerfs provided for the reception of the seal members 74 and 75. Such two concentric projections act as a locating means to loosely pilot an annular ring member 78 held beneath cover plate 26.

Ring 78 has diametrically opposed openings 79 in its side walls for the passage of fluid to and through a port or opening 80 formed in one edge of the element plate 71. Opening 80 is normally disposed as to register with passageway means 81 leading to a second pilot valve assembly 82 and particularly to a valve chamber 83 in the portion 22 of the valve body 11. Such chamber 83 is separated from a discharge port 84 therefor by means of a sliding pilot valve member 85 constructed similar to the corresponding member 43 of the pilot valve assembly 35 described hereinabove. It will be recognized that the pilot valve member 85 is adapted to slide reciprocally within chamber 83 as controlled by water pressure on one side and the action of a needle valve core member 86 on its other side; the latter operating in response to electrical energization of the solenoid coil 87.

With the arrangement thus described, cold water at intake chamber 88 passes directly into chamber 19 so as to surround the upper end of the piston valve 51. If such piston valve is seated tightly against the smooth lower face of the element plate 71, as shown in Figure 2, cold water will be prevented from passing into chamber 20 surrounding the thermostatic element 60. Under proper thermal conditions however, piston 51 will lower sufficiently from its Figure 2 position to permit the passage of cold water from chamber 19 into the mixing chamber defined at the upper end of chamber 20 and chamber 89 defined by the annular ring 78, element plate 71, and cover plate 26. Communication between chambers 20 and 89 is made by the port means 72 and 73 so that cold water may pass into chamber 89 and thence outwardly via ports 79, 79 and opening 80 in the element plate to the control passageway 81 leading to the pilot control valve means 82 and particularly to the member 85 which seals over outlet 84. Opening of this seal member permits the cold water to enter outlet 84 so that water may pass into the discharge chamber 18 for discharge from the valve by way of the discharge opening or means 37 and 38.

Having hereinabove therefore set forth the description of the elements and their association in the improved valve means of my invention, the operating cycle and control conditions of such valve will now be described.

Briefly, hot water entering the intake chamber 30 is channeled via passageway 32 to the control station for the pilot valve means 35. Secondary passageway 31 permits hot water to enter the lower end of the mixing piston cylinder and particularly the interior of the piston means 51, providing such piston is raised off the lower seat presented by the wall 13 of the valve body. The presence of the hot water about the thermostatic element 60 causes the latter to expand and particularly the lowermost end portion 64 thereof to move axially relative to the fixed body portion 62 thereof. As such end portion 64 moves downwardly, it forces the saddle member downwardly compressing spring 57 and moving piston 51 and spring 53 therewith until the lower end of the valve piston 51 seats tightly against wall 13. Continued expansion of the element 62 brings into play the override action of spring 53 to avoid rupture of the lower valve seat presented by wall 13. As the valve piston 51 lowers, its upper end moves away from the upper seat provided at the lower face of the element plate 71, thereby permitting cold water in chamber 88 to pass through the annular chamber 19, over the upper edge of the valve piston 51, around the thermostatic element 60, through the port means 72 and 73 and into the upper mixing chamber 89. The introduction of the cold water to chamber 20 serves to intermingle the same with the hot water in that chamber as well as in the subsequent mixing chamber 89 to arrive at a fluid mixture of intermediate temperature. In this respect, it will be appreciated that as cold water flows past the thermostatic element 60 the expansion thereof is dampened to effect a desired balance between the hot water passageway beneath the lower end of the piston 51 and the cold water passageway over the upper end of the valve piston 51. The mixed water passes from chamber 89 outwardly through the passageway means 79 for discharge through the opening 80 in the element plate, passageway means 81 and the control of valve assembly 82.

The above described intermixing action is controlled by the position of the mixing piston 51 and the activity of the thermostat 60, with the flow of intermixed water being possible only upon the energization of the solenoid operated pilot valve means 82.

Upon the energization of only the pilot valve assembly 35 (pilot valve 82 closed) hot water passes directly through passageway 32, past the pilot valve seat member 43 into passageway means 34 and chamber 18 and directly to the discharge means 38 of the valve body.

In addition to the normal above described operations in which either the pilot valve means 35 or 82 are selectively opened one at a time, it is also possible and contemplated within the scope of my invention that both such pilot valve means 82 and 35 may be energized simultaneously. In this event an intermixed liquid of a secondary temperature will be gained. That is to say, with both pilot valve means 35 and 82 energized, hot water at the inlet chamber 30 will pass directly through the pilot valve means 35 into the discharge chamber 18 as well as beneath the valve piston 51 to enter chamber 20. Likewise, cold water will be admitted over the top of piston 51 from chamber 19 as before described. The intermixed fluid resulting in chambers 20 and 89 will then admix with the hot water or fluid in the discharge chamber 18 to create an intermixed liquid of intermediate temperature somewhat elevated from the normal intermixed fluid first described. Thus it will be understood that depending on the individual or simultaneous energization of the solenoid valve means 35 and 82, it is possible to gain liquid at the discharge outlet 37 of three separated temperatures.

From the operating description set forth, it will be understood that in the event that both solenoid operated pilot valves are closed, hot water is present in the chamber 20 and mixing chamber 89 by reason of the normally raised piston cylinder 51. In such instance, the valve piston 51 is lowered in the presence of such hot water or heated liquid to position the same preparatory to the next operating cycle. Discharge of liquid from chamber 89 is prevented, however, by the closed condition of the pilot valve means 82 so that the piston in effect is kept in a standby condition awaiting the operation of the said valve 82 even if straight hot water is being discharged. This feature is helpful in the cyclic operation of an automatic washer, for example, whereat prepositioning of the valve is desirable in the off-cycle periods when neither of the solenoid operated pilot valves is open or if the hot water pilot control valve is open. It is a unique and outstanding feature of my valve that this function may take place in the non-operated condition of the valve as explained. Because of this activity, the thermostatic element 60 is preconditioned to properly port the flow of hot and cold fluids so that subsequent demand for intermixed liquid is rapidly met in an efficient manner requiring little or no "hunting" of the valve means 51 to produce the correct mixture.

In addition to the foregoing described basic construction, the valve of my invention may also embody various modified arrangements of its element (particularly of the thermostatically actuated mixing piston valve system) whereby the intermixture of fluids is controlled. In Figures 7–14 of the drawings, I have set forth modified mechanisms whereby the thermostatic control of the intermixing function may be brought about. It will be recognized that the several structures illustrated in general parallel the structure illustrated in Figures 2 and 4 in which a cyclindrical mixing piston valve 51 is effectively activated.

As seen in Figure 7 of the drawings, a modified thermostatic control assembly 100 (represented in partial enlarged cross section) includes a housing substantially on the order of housing 11 described hereinbefore with certain modifications to accommodate changes in the structure for the control of the mixing piston 101 therein. Briefly, the valve housing portion shown includes a hot water inlet passageway 102, a cold water inlet passageway 103 leading to an annular chamber 104 about valve piston 101, a central piston mixing chamber 105 and an upper mixing chamber portion 105a located substantially around the upper end of a thermostatic element 106. Chamber 105a is defined generally by an annular spacer ring 107 mounted in the upper end of the valve body. A cover member 26, as before described, suitably encloses or encases the upper end of chamber 105a with the ring member 107 having a port means 108 at one side for the transfer of liquids to a discharge chamber (not shown) and a pilot control valve means (not shown) such as chamber 18 and valve means 82 of Figure 2.

Ring 107 rests atop a flange portion 109 of an insert ring 110; flange 109 being distinguished by port openings 111 for the passage of fluid between chambers 105 and 105a. The insert 110 is fitted with a suitable annular kerf for the reception of an O-ring seal 112 which engages wall portions 113 and 114 of the valve housing immediately opposite the thermostatic element 106.

Thermostatic element 106 is formed with the usual movable portion 115 at its lower end and bears an enlarged body portion 116 which engages the under surface of the inward radial extension of flange 109 on the insert member 110. The movable element 115 of the thermostatic device enters and engages a central cup portion of a below disposed saddle spider member 117 which is mounted internally of the valve piston 101; such being in engagement with a shoulder 118 of the valve piston. A snap ring 119 is located internally of the valve piston 101 and near the lower end of the latter; such being received in a suitable annular slot formed in the internal side walls of the valve piston. An override spring 120 is located between the snap ring 119 and the lower face of the saddle 117; spring 120 serving also to maintain the saddle member 117 tightly against the shoulder 118 of the valve piston.

Externally of the valve piston and adjacent the upper end thereof is a second annular snap ring 121 which extends radially outward of the exterior of the valve piston and forms a shoulder extension for abuttingly engaging the upper end of a second spring 122 which is somewhat weaker than spring 120. The lower end of spring 122 rests atop an annular insert ring 123 fitted with an O-ring seal member 124 on its exterior surface and an annular seal ring 125 on its interior surface. Seal 124 engages wall portions 113 and 126 of the cast housing while seal 125 engages the external side walls of the valve piston 101. The insert member 123 is fitted over plural extending projections 127—127 formed on the wall portions 126 and 113 according to the concepts of a bayonet slot connector.

In operation, the above described elements serve to support and move the piston cylinder 101 axially and relative to the lower face 128 of insert member 110 and the upper face 129 of a lower wall 130 in the valve housing. With the piston 101 in its raised condition, as shown, hot water will flow from inlet 102 to the interior of the piston 101 and upwardly around the thermostatic element 106 into chamber 105. Eventually, the hot water passes through ports 111 into chamber 105a, then outwardly through discharge port 108 of ring 107. As the thermostatic element 106 is heated, its movable portion 115 extends axially downward to first compress spring 122 thereby causing the upper end of the piston cylinder 101 to leave its seated engagement with surface 128 of insert member 110. This latter activity permits cold water from inlet 103 to flow over the upper end of the piston 101 into the mixing chamber 105, and through ports 111 into the upper chamber 105a. At the same time, the flow of hot water beneath the lower end of piston 101 is correspondingly restricted. The balance between the fully raised position of the piston 101 and the fully lowered position thereof regulates the intermixture of the hot and cold fluids, as desired, and is controlled by the functioning of thermostat 106.

It will be understood that in the presence of abnormal temperatures causing extreme extension of the movable element 115 in the thermostat, override spring 120 permits such over expansion even though the valve piston 101 be bottomed against surface 129 of the housing wall 130 without injury to the thermostat, etc.

In Figure 8, I have illustrated a second modification of the thermostatically actuated mixing control system; the assembly of Figure 8 paralleling the features of the assembly illustrated in Figure 7. Specifically, modified assembly 135 of Figure 8 includes a cast housing having an internal concentric labyrinth chamber system as previously related and provided with a hot water inlet 136 and a cold water inlet 137. The valve housing has an internal annular wall 138 which defines with wall 139 a substantially cylindrical chamber for the assembly of a movable mixing piston 140. Walls 138 and 139 are cross connected by bottom wall 141 at their lower ends and a cover member 26 closes off the upper end of the housing. Both walls 138 and 139 are distinguished by a series of projections 142 in an annular array which are embraced by plural bayonet slots 143 of a cylindrical inner ring or sleeve 144. Ring 144 bears an annular O-ring seal 145 on its exterior surface to make sealing contact with walls 138 and 139. An annular seal 146 is also provided on the internal face of ring 144 for engaging the external side walls of the valve piston 140 as the latter slides axially within ring 144.

A ring member 147 having output port means 148 is positioned adjacent the upper end of the housing on top of an insert ring 149 corresponding to the construction and disposition of ring 110 in Figure 7. Ring 149 bears an annular O-ring seal 150 on its exterior for sealing engagement with the adjacent side walls 138 and 139 of the housing. Ring 149 also bears ported openings 151 for the passage of intermixed water from mixing chamber 152 to the upper mixing chamber 152a defined by the annular ring 147. A thermostatic element 153 is disposed with an enlarged flange portion 154 in abutting engagement with the insert 149 so that the movable element 155 therein is disposed dependingly downward to engage a central platform of a saddle member 156. The saddle member 156 rides in slots between separated arms 157 of a saddle carrier 158; such arms being flared over in an annular manner at their upper ends to rest on top of an internal shoulder 159 of the piston 140. Note that the saddle 156 is suitably formed to ride in slots 160 of the carrier 158 against the force of spring member 161; the lower end of such spring resting on top of the lower platform portion 162 of the carrier member.

Initial expansion of the thermostatic element 153 serves to drive the valve piston 140 downwardly against the force of a second spring means 164 which surrounds spring means 161 and the carrier member 157, but radially inward of the side walls of the valve piston. The lower end of spring 164 rests on top of a four legged spider 165. Spider member 165 serves to space the spring means 164 from the bottom wall 141 of the valve body for the passage of water therebeneath. The upper end of spring 164 is engaged by the lower end of the annular shoulder portion 159 of the valve piston 140.

In operation of the assembly 135, hot water at inlet 136 will pass beneath the lower skirt or end of the valve piston 140 upwardly into the mixing chamber 152 whereat such activates the movable portion 155 of the thermostatic member 153. Such activation of the thermostat serves to drive the valve piston 140 downwardly against the compressive force of spring 164 so that the lower skirted portion of the valve piston is eventually seated or approaches a seating condition with the upper face of the lower wall 141 in the body casting. Simultaneously, water from cold water inlet 137 is permitted to flow over the upper end of valve piston 140 into the mixing chambers 152 and 152a where it is admixed with the hot water to form an intermixture of suitable temperature depending on the actuation of the thermostatic element 153. Water in chambers 152 and 152a passes through porting means 148 into the discharge chamber of the valve body in the manner previously related. In the event of excessive temperatures, override function for the thermostat is provided by virtue of spring means 161.

Figure 9:
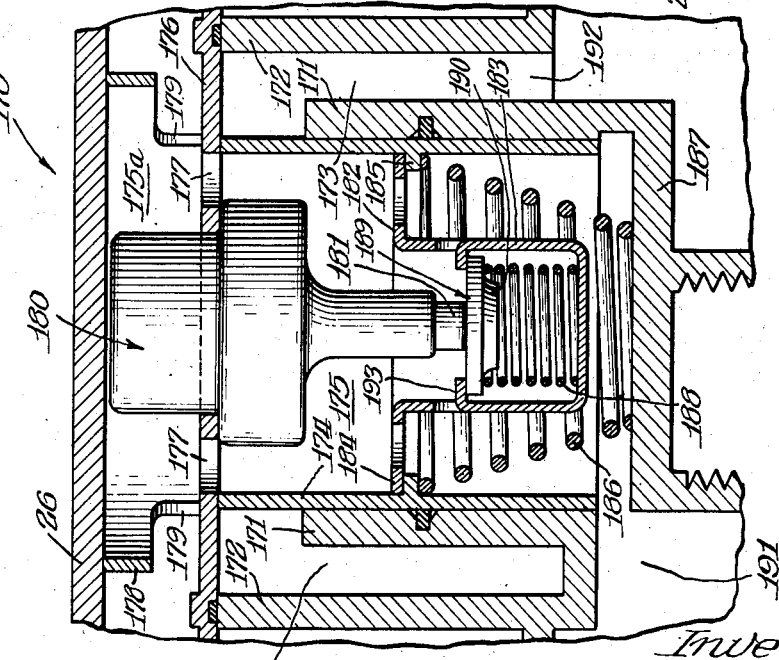
Figure 9 is another cross-sectional view similar to Figure 7, illustrating the features of a third modified form of control valve assembly.

In Figure 9 I have illustrated a still further embodiment for the thermostatically actuated valving assembly. Assembly 170 of this figure includes a cast valve body or housing having spaced internal annular walls 171 and 172 which define therebetween an annular cold water chamber 173. A valve piston 174 of cylindrical formation rides along the cylindrical interior surface of wall 171 in chamber 175 formed thereby. A removable element plate 176 bridges the walls 171 and 172 to close off the upper end of the cold water chamber 173 and such plate is provided with exit ports 177 for the passage of water from chamber 175 to an upper mixing chamber 175a. The upper mixing chamber 175a is defined by an annular ring member 178 having exit ports 179 and a cover plate 26. A thermostatic element 180 having a movable portion 181 is mounted centrally of the element plate 176 to depend into chamber 175. A cup-like saddle member 182 having a cylindrical cup or body portion 183 and an annular upper flange portion 184 is provided within the internal confines of the valve piston 174, with the outer end of flange portion 184 contacting an internally extending annular rib 185 formed on the internal face of the valve piston.

A conically tapered spring 186 has its upper end resting against the lower face of the rib portion 185 and its lower end resting on top of lower wall 187 in the valve body. Disposed centrally within the saddle member and coaxially of the body portion 183 thereof, is a second spring 188 constituting an override spring in this assembly. The lower end of spring 188 rests on the lower platform portion of the saddle member and the upper end thereof is received by a pilot disc member 189 having a central pilot portion 190 for locating the spring 188. The upper face of the disc member 189 engages the lower end of the active or movable portion 181 of the thermostatic means 180. Disc 189 is held beneath ears 193 stuck inwardly of the body portion 183 for the saddle.

As shown in Figure 9, the valve piston 174 is in its fully raised condition with the upper end thereon contacting the lower face of the element plate 176. In this condition, hot water at inlet means 191 passes beneath the lower end of the valve piston 174 into chamber 175 surrounding the thermostatic means. As the hot water passes upwardly through ports 177 into the upper mixing chamber 175a, the movable element 181 is accordingly activated to initially compress spring 186 and carry the valve piston 174 toward the lower wall 187 of the valve housing. Such downward movement of the valve piston serves to throttle the flow of hot water into chamber 175 and to permit the entry of cold water into chamber 175 from the cold water chamber 173 as supplied by cold water inlet 192 over the upper end of the valve piston similar to the operation of the devices heretofore described so that the intermixing of fluids at a predetermined thermal level may take place.

Figure 10:
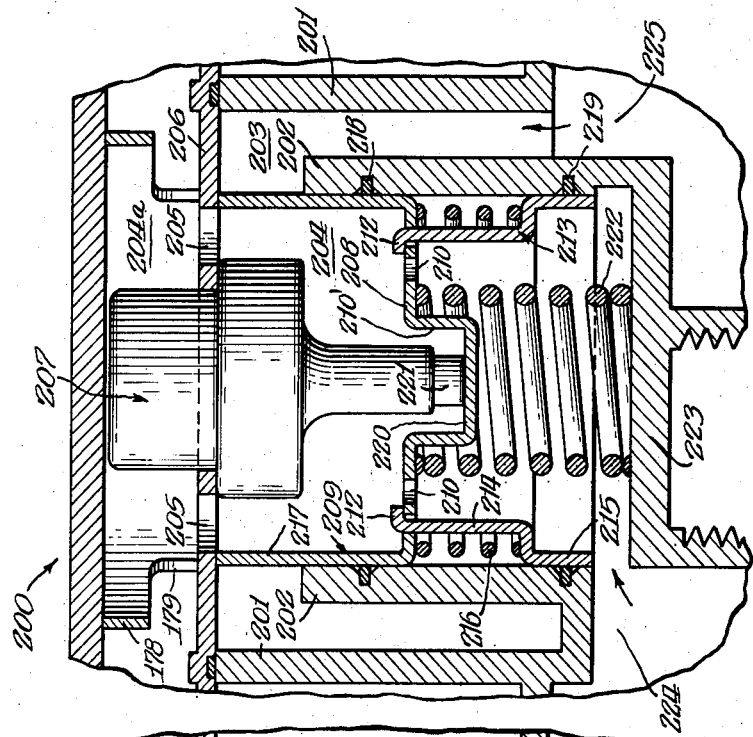
Figure 10 is a cross-sectional showing similar to Figure 9, illustrating a fourth modified form of control valve assembly.

In Figure 10, I have illustrated a still further modified structure which follows closely the teachings of the structure set forth in Figure 9 of the drawings. It will be recognized again that the valve body of assembly 200 illustrated is defined with concentrically spaced internal walls 201 and 202 to provide an annular cold water chamber 203 and a substantially cylindrical central chamber 204 which communicates through ports 205 on element plate 206 with an upper mixing chamber 204a. A thermostatic means 207 is disposed as before with its body portion extending through and in abutting engagement with the lower face of the element plate 206.

A saddle portion 208, comprising a bottom wall of modified piston valve 209, supports the lower end of the thermostat 207. Openings 210 are formed through the saddle for the entry of struck over ears 212 associated with a lower cylindrical valve piston 213. The lower valve piston is constructed with two diameters so as to comprise arm portions 214 joined to a lower cylindrical portion 215, the latter of which lies on a greater diameter than the former. The inset arm portion 214 accommodate the mounting of a surrounding spring means 216 between the two valve piston members 209 and 213; spring 216 comprising an override spring in this assembly for resiliently opposing relative movement between the two pistons 209 and 213. The cylindrical outer face of piston portion 215 and wall portion 217 of the upper valve piston member are like diametered and ride over annular seals 218 and 219 mounted in the annular wall 202 of the body casting. By interconnecting the upper and lower valve piston portions, as described, the same ride as a unit coaxially of the cylindrical wall 202. The saddle portion 208 of the upper valve piston member 209 bears a central pilot cup 220 which receives the active or movable element 221 of the thermostatic means 207. Such cup 220 also pilots the upper end of a second spring means 222 against which the thermostatic means 207 initially acts in its expanding function to lower the valve piston assembly away from the lower face of the element plate 205 and toward a lower wall 223 of the valve body.

In operation, hot water at inlet 224 passes beneath the lower end of the lower valve piston 213 into the mixing chambers 204 and 204a to activate the thermostat as heretofore described. Expansion of the thermostatic means and particularly downward movement of the active element 221 therein, drives the valve piston assembly downward and permits the flow of cold water from chamber 203, fed by cold water inlet 225 over the upper end of the upper piston 209 and into the mixing chambers 204 and 204a. Mixed water passes to discharge chambering and solenoid control pilot valve means as heretofore described.

In Figure 11, I have illustrated a modification of the Figure 10 assembly which varies chiefly thereover by rearrangement of the spring system associated with the thermostatic element.

Briefly, it will be recognized that the assembly 230 of this figure comprises a valve housing substantially identical to the valve housing of the Figure 10 assembly. Such is formed with concentrically spaced walls 201' and 202' which form an annular cold water chamber 203'; the annular wall 202' defining a cylindrical central chamber for the valve piston assembly and defining a lower mixing chamber 204'. Chamber 204' is closed over at its upper end by an element plate 205' having port means 206' therein and a central opening receptive of the upwardly extending thermostatic element 207'.

Mounted concentrically of the mixing chamber 204' and in sliding contact with the internal face of the wall 202', is the valve piston assembly comprising an upper valve piston 209' having a bottom enclosing saddle portion 208' distinguished by a central recess which is receptive of the lower end of the thermostatic element 207'. The saddle portion is equipped with fluid passage ports 210' and openings 211' for the reception of ear portions 212' associated at the upper end of a lower piston valve means 213'. The lower valve piston 213' is formulated with radially inset arm portions 214' from which the ear members 212' extend and a larger cylindrical wall portion 215' which acts as a valve means in closing off the flow of hot water therebeneath as in the Figure 10 assembly. The interconnection of the upper and lower valve pistons 209' and 213' is similar to the Figure 10 assembly; the ears 212' being struck over on top of the saddle portion 208' with the valve pistons operating as a unit. The two assembled valve pistons slide along the inside face of wall 202' and particularly pass across annular seal rings 218' and 219', mounted in such wall 202'.

The thermostatic element 207' is equipped with the usual movable portion or element 221' depending from its lower end and contacting a platform 220' in the recess of the saddle portion 210'. Downward movement of the upper valve piston 209' is particularly opposed by a spring member 222' which contacts the upper face of lower wall 223' of the valve housing at its lower end and engages the lower face of the saddle 208' at its upper end. A second spring member 231 is mounted intermediate the body 232 of the thermostatic element 207' and the upper face of the ears 212' associated with the lower valve piston member 209'. Such spring member serves to maintain the upper and lower valve pistons in their assembled interconnected relationship and further serves to drive the lower valve piston 213' downwardly to follow the downward progress of the upper valve piston 209' as activated responsively by the expansion of the thermostat 207'.

Operation of the assembly 230 is generally, as described, previously for the Figure 10 assembly with hot water entering chamber 204' beneath the lower end of the lower valve piston 213' to thermally expand the thermostatic element 207' and thereby drawing the upper valve piston 209' away from the lower face of the element plate 205'. This action permits cold water in chamber 203' to flow over the upper end of the upper valve piston 209' into mixing chamber 204'. To provide the passage of hot water from the lower end of the valve piston assembly into chamber 204', a substantially horizontal platform portion 232 of the lower valve piston member 213' is equipped with ports 233 which communicate with the ports 210' in the upper valve piston. The distance that the valve piston assembly is removed from walls 223' and 205' is, of course, regulated by the control of the thermostatic means 207'.

In Figure 12, I have illustrated a still further modification for the thermostatic control system of my improved valve of this invention. As shown in that figure, the thermostatic control assembly 234 comprises an improved piston valve assembly mounted in a cast housing having concentrically spaced internal walls 235 and 236 between which is formed an annular cold water chamber 237. An element plate 238 is disposed across the top of walls 235 and 236 in contact with the latter wall and with wall 235 spaced from such element plate for the passage of cold water into mixing chambers 239 and 239a. An annular ring 240 is disposed on top of element plate 238 to define the secondary mixing chamber 239a; such ring being covered over by cover plate 241 similar to the previously described housing assemblies.

Plate 238 is provided with suitable fluid passage ports 242 and a central opening for the reception of a thermostatic element 243. The thermostatic element 243 has an actuating or movable portion 244 which bears against a central platform 245 of saddle member 246. Saddle member 246 also has a planar flange portion 247 defining its outer annular limits which has port openings 248 for the passage of water into the mixing chamber 239.

A substantially cylindrical valve piston 250 is mounted concentrically within the annular wall 235 so as to move axially in response to the elongation and shortening of the thermostatic element 243. In this regard, it will be noted that lugs 251 are struck inwardly of the side walls for the piston cylinder 250 adjacent the upper end thereof for maintaining the saddle member 246 in assembled condition within the cylindrical interior of the valve piston 250. In its assembled relationship with the valve piston, the platform portion 247 of the saddle member overlies the upper end of a compression spring 252 which is the override spring of this assembly. The lower end of this spring engages an inwardly turned lip portion 253 of the valve piston 250 so that it is contained within the piston.

The upper end of the valve piston works against the lower face of the element plate 238 to valve or control the flow of cold water into the mixing chamber 239. The lower end of the valve piston and particularly the inwardly turned lip portion 253 thereon, bears against the upper end of a second compression coil spring 254 which extends between such platform and the upper face of bottom wall 255 for the valve housing.

It should be noted particularly that the coils of spring 254 are constructed with substantially square or rectangular cross section so that adjacent coils of the spring present opposed planar faces. The control of hot water from hot water intake or inlet port 256 underneath the valve piston 250 into the mixing chamber 239 is regulated by the spacing between adjacent coils of spring 254; such spacing being varied in response to axial motivation of the valve piston 250 caused by the activity of the thermostat 243. It will be recognized that an improved valving means for the control of the hot water inlet is thus provided by the operation of spring 254.

The operation of this improved assembly varies only slightly from the corresponding assemblies previously described with the cold water entering the mixing chambers 239 and 239a between the lower face of the element plate 238 and the upper edge of the valve piston 250 while the intake of hot water from inlet 256 is controlled by the spaces intermediate the coils of spring 254.

In Figure 13, a modification of the Figure 12 assembly is illustrated. In the assembly 260 of this figure, the valve housing again comprises concentrically spaced internal walls 235' and 236', cold water chamber 237', element plate 238' extending across walls 235' and 236', internal mixing chambers 239' and 239a', an annular ring 240' defining the upper mixing chamber 239a' and cover plate 241'. Thermostatic element 243' with movable portion 244' is mounted through the element plate 238', as in the Figure 12 assembly. The movable portion 244' of the thermostatic member contacts platform portion 245' of a saddle 246' identical to the saddle member 246 of the Figure 12 assembly. The saddle member has an annular platform portion 247' which engages the upper end of an override spring 252'. Spring 252' is mounted and carried internally of a cylindrical cage 261 which corresponds closely to the piston valve 250 of the Figure 12 assembly, but in this particular assembly does not function as a valve.

The cage 261 is provided with a turned-in platform portion 262 adjacent its lower end and inwardly turned ear portions 263 at its upper end for caging the saddle member 246' and spring member 252' in assembled relationship.

The lower end of the cage member and particularly the platform portion 262 thereon engages a compression valve spring member 254' which has a substantially square cross section and acts as a variable valve system in response to axial motivation of the cage member 261 caused by operation of the thermostatic element 243'. A second square cross section compression spring 265 is similarly mounted between the upper end of the cage member 261 and the lower face of the element plate 238'. Spring 265 functions in a manner identical to spring 254', but is slightly weaker than the latter so that the spring 254' normally biases the cage assembly upwardly to close the coils of spring 265 and thereby prevent the flow of cold water from the cold water chamber 237' to mixing chamber 239'. Hot water from inlet 266 likewise passes between the coils of spring 254' at the lower end of the valve assembly, as before in the Figure 12 assembly, with such hot water passing through ports 248' in the saddle member so that it mixes with cold water in chamber 239' and 239a'; the element plate 238 having ports 242' for passage of water into upper mixing chamber 239a'.

As the thermostat 243' is heated, the movable element 244' therein elongates downwardly to decrease the spacing between the coils of spring 254' thereby increasing the spacing between the coils of spring 265. Thus the valve port system provided by spring 265 is opened permitting the entry of cold water from chamber 237' for admixture with hot water in the chambers 239' and 239a'.

The secondary spring 252' located within cage means 261 constitutes an override spring for abnormal temperature conditions wherein the spring 254' is bottomed or completely compressed and it is therefore necessary to provide means for continued axial expansion of the thermostat 243'.

From the foregoing description, it will be appreciated that the assembly 260 of Figure 13 is substantially the same as assembly 235 of Figure 12 with the exception that the two springs, 265 and 254' are utilized as a porting valve system.

In Figure 14, a still further modified assembly 270 is shown in which the valve housing comprises internal concentrically related walls 271 and 272, forming a cold water chamber 273 therebetween. Cold water inlet 274 supplies chamber 273 and a hot water inlet 275 supplies hot water to the interior of a mixing chamber 276, as will be related presently.

Chamber 276 is formulated by the upper cup end of a cylindrical valve piston 277; such cup's upper end presenting a saddle portion 278 centrally thereof with concave walls 279 having ports 280 therethrough for the passage of hot water to mixing chamber 276. The upper limits of chamber 276 are defined by an element plate 281 having a centrally indented saddle portion or substantially cylindrical recess 282 for receiving and piloting a thermostatic element 283 of the order heretofore described. Element plate 281 is equipped further with ported openings 284 radially outward of its saddle portion 282 for transmitting fluid from chamber 276 to an upper mixing chamber 276a defined by a cylindrical spacer ring 286 having exit ports 287 in its opposite side walls. The upper end of the mixing chamber 276a is closed over by cover plate 288.

The modified assembly of Figure 14 differs substantially from those previously described in that the piston cylinder 277 does not ride against the internal face of wall 272, or that is, ride on the cylindrical surface formed by the annular wall 272. Instead a seal assembly indicated generally at 290, comprising an annular ring 291, carries an annular seal or gasket 292 on its inner face, and an O-ring seal 293 on its outer face. Assembly 290 is mounted concentrically of the wall 272 with the seal 292 engaging the external face of the valve piston 277. It will be noted that the ring 291 is loosely fitted inwardly of wall 272 and that it is held against upward movement beyond a designated limit as defined by an annular snap ring 294 locked in wall 272. The lower end of ring 291 rests on the periphery of an inverted saddle member 295 having a central cup portion 296 for piloting and supporting a first compression spring 297. A second compression spring 298 surrounds the saddle cup portion 296 so that its lower end rests on top of a lower skirted portion 300 of the lower saddle member 295. The upper end of spring 298 is received concentrically about the depressed platform portion of the upper saddle portion 278. With this arrangement, the elongation of the movable element 310 for the thermostat serves to originally compress spring 298 to force the valve piston 277 away from the lower face of the element plate 281 (that is, downward, as seen in Figure 14). Such downward movement of piston 277 moves the same relative to the lower saddle member 295 which remains stationary under the force of spring means 297.

The flange portion 300 of the lower saddle member bears ported opening 302 for the entry of hot water from the inlet passageway means 275. Therefore, as the valve piston 277 moves relative to the platform portion 300, the flow of water beneath the lower edge or skirt of the valve piston 277 and such platform 300 is correspondingly regulated. Hot water which flows beneath the lower end of the valve piston enters the mixing chamber 276 via ports 280 in the wall portions 279 of the upper saddle member of the valve piston 277 whereat it mixes with cold water from chamber 273 flowing over the upper end of valve piston 277. Intermixed water passes through ports 284 of the element plate into the upper mixing chamber 276a from whence it flows outwardly through the ports 287 to the discharge outlet of the valve (not shown).

Spring 297, in addition to holding the lower saddle member 295 against the seal carrying ring 291, also provides an override system to accommodate abnormal temperature expansion of the thermostatic element 283. During such override function which accompanies the abnormal expansion of the thermostat, the entire valve assembly comprising the piston 277, which is then bottomed against flange 300 of the lower saddle member, moves downwardly toward the lower wall 303 of the valve body.

From the foregoing descriptive materials, it is believed that the details of construction and operation for the improved valve of this invention will be clearly understood. Further, those skilled in the art will readily understand the several modified constructions for the thermostatically operated control valve assemblies, as found in Figures 7 through 14 of the drawings. Basically, these modified control valve asemblies operate along the same general lines and perform the function of intermixing fluids of dissimilar temperature to arrive at a mixture of intermediate temperature. It will be appreciated that the several modified forms in Figures 7 through 14 are readily substituted for the basic thermostatically operated mixing piston assembly of the Figure 1 device and that while the drawings and descriptions outline certain basic and preferred modified forms for the valve of this invention, various modifications, changes and substitutions of equivalent materials may be made therein without necessarily departing from the spirit and scope of the invention involved. As a consequence, it is not my intention to be limited to the particular form and structures described and illustrated except as may appear in the following appended claims.

I claim:

1. A mixing valve of the class described for intermixing fluids of dissimilar temperature, comprising, a main body, first and second annular, concentrically related chambers carrying first and second fluids, respectively, a central chamber coaxial with said annular chambers, a first fluid inlet at one end of said valve body, a second fluid inlet at said one end of said valve body communicating with said second annular chamber, first valve means controlling the flow of fluids from said first inlet to said first annular chamber, a discharge outlet communicating with said first annular chamber, a second valve means in said central chamber, thermostatic means controlling movement of said second valve means in a first direction, spring means opposing said thermostatic means and biasing said second valve means in a second direction, first passageway means communicating between said first fluid inlet and said central chamber, second passageway means communicating between said second annular chamber and said central chamber, movement of said second valve means in said first and second directions serving to control and proportion the flow of said fluids through said first and second pasageway means and into said central chamber thereby to achieve an intermixed fluid of preselected temperature, and outlet port means leading from said central chamber to said discharge outlet.

2. A valve of the class described for intermixing fluids of dissimilar temperature, comprising, a main valve body, a pair of concentrically related annular fluid carrying chambers, one for carrying hot fluid and one for carrying cold fluid, a central chamber coaxial with said annular chambers, a hot fluid inlet, a cold fluid inlet communicating with the said sold fluid carrying annular chamber, pilot valve means controlling fluid flow from said hot fluid inlet to the hot fluid carrying chamber, a discharge outlet communicating with said hot fluid carrying chamber, a mixing valve means in said central chamber, thermostatic means controlling axial motivation of said mixing valve means in a first direction, spring means opposing said thermostatic means and biasing said mixing valve means in a second axial direction, first passageway means communicating between said hot fluid inlet and one end of said central chamber, second passageway means communicating between said cold fluid carrying chamber and the opposite end of said central chamber, axial movement of said valve means in said first and second directions serving to control and proportion the flow of said fluids into the opposite ends of said central chamber for their intermixture adjacent and surrounding said thermostatic means, and an outlet means leading from said central chamber to said discharge outlet.

3. A valve of the class described for intermixing fluids of dissimilar temperature, comprising, a main valve body, a pair of concentrically related annular fluid chambers, one for carrying hot fluid and one for carrying cold fluid, a central cylindrical chamber coaxial with said annular chambers, a hot fluid inlet at one end of said valve body, a cold fluid inlet at the same end of said valve body communicating with the cold fluid carrying annular chamber, a pilot valve means controlling fluid flow from said hot fluid inlet to the hot fluid carrying chamber, a discharge outlet communicating with said hot fluid carrying chamber, a piston valve means in said central chamber, thermostatic means controlling axial motivation of said piston valve means in a first direction, spring means opposing said thermostatic means and biasing said piston valve means in a second axial direction, first passageway means communicating between said hot fluid inlet and one end of said central chamber, second passageway means communicating between said cold fluid carrying chamber and the opposite end of said central chamber, axial movement of said piston valve means in said first and second directions serving to control and proportion the flow of said fluids through said two named passageway means into said central chamber to achieve an intermixed fluid of preselected temperature, and an outlet means leading from said central chamber to said discharge outlet.

4. A valve of the class described for intermixing fluids of dissimilar temperature, comprising, a main valve body, first and second concentrically related annular fluid carrying chambers respectively carrying first and second fluids, a central third chamber of cylindrical formation coaxial with said first and second chambers, a first fluid inlet at one end of said valve body, a second fluid inlet at the same end of said valve body communicating with said second annular chamber, a pilot valve means controlling fluid flow from said first fluid inlet to the first fluid carrying chamber, a discharge outlet communicating with said first fluid carrying chamber, a piston valve means in said central chamber, thermostatic means controlling axial motivation of said piston valve means in a first direction, spring means opposing said thermostatic means and biasing said piston valve means in a second axial direction, first passageway means communicating between said first fluid inlet and one end of said central chamber, second passageway means communicating between said second fluid carrying chamber and the opposite end of said central chamber, axial movement of said valve means in said first and second directions serving to control and proportion the flow of said fluids through said two named passageway means into the central chamber to achieve an intermixed fluid of preselected temperature, a third passageway means communicating between said central chamber and said first annular chamber, and a second pilot valve means controlling the flow of the intermixed fluid through said third passageway means.

5. A valve of the class described for intermixing fluids of dissimilar temperature, comprising, a main valve body, first and second concentrically related annular fluid chambers for respectively carrying first and second fluids, a central third chamber of cylindrical formation coaxial with said annular chambers, a first fluid inlet at one end of said valve body, a second fluid inlet at the same end of said valve body communicating with said second fluid carrying chamber, a first pilot valve means controlling fluid flow from said first fluid inlet to the first fluid carrying chamber, discharge outlet means communicating with said fluid carrying chamber, a piston valve means in said third chamber, thermostatic means for motivating said piston valve means in a first axial direction, spring means opposing said thermostatic means for biasing said piston means in a second axial direction, first passageway means communicating between said first fluid inlet and one end of said third chamber, second passageway means communicating between said second fluid carrying chamber and the opposite end of said third chamber, an element plate overlying said opposite end of said central third chamber and serving to isolate the upper ends of said first and second chambers from one another, a fourth chamber coaxial with said third chamber and on the opposite side of said element plate therefrom, third passageway means communicating between said fourth chamber and said third chamber, fourth passageway means communicating between said fourth chamber and said discharge outlet, and second pilot valve means in said fourth passageway means for controlling the passage of fluid therethrough; the axial motivation of said piston valve means serving to control the flow of and proportion the amount of said first and second fluids entering said third chamber through said first and second passageway means whereby the same are intermixed to achieve a preselected temperature therefor, the intermixture of said fluids taking place in said third and fourth chambers adjacent and surrounding said thermostatic means.

6. The combination as set forth in claim 5 in which said fourth chamber is defined between the top wall of said valve body and said element plate by an annular ring having suitable exit ports for the passage of fluids from said third to said fourth passageway means.

7. The combination as set forth in claim 5 in which said first and said second pilot valve means, comprise electrically operable solenoid means motivating a pilot valve assembly.

8. The combination as set forth in claim 1 in which said spring means comprise a pair of springs one resiliently opposing the normal expansion of said thermostatic means and the other accommodating abnormal expansion thereof.

9. A mixing valve of the class described for intermixing fluids of dissimilar temperature, comprising, a main valve body, first and second annular and concentrically related chambers carrying first and second fluids, respectively; a central chamber coaxial with said annular chambers, a first fluid inlet at one end of said valve body communicating with said first annular chamber, first valve means controlling the flow of fluid from said first inlet to said first annular chamber, second valve means in said central chamber, thermostatic means controlling movement of said second valve means in a first direction, spring means opposing said thermostatic means and biasing said second valve means in a second direction, an element plate overlying said chambers and forming a first valve seat for said second valve means at one end of said central chamber, a bottom wall of said valve body forming a second valve seat for said second valve means at the opposite end of said central chamber, a first passageway means between said first fluid inlet and said opposite end of said central chamber, second passageway means between said second annular chamber and said one end of said central chamber, movement of said second valve means in said first and second directions serving to control and proportion the flow of fluids through said first and second passageway means respectively, a third passageway means communicating between said central chamber and said first annular chamber, and discharge outlet means communicating with said first annular chamber and third valve means for controlling the flow of fluid through said third passageway means.

10. The combination as set forth in claim 9 in which said second valve means comprises a cylindrical piston valve, said thermostatic means comprises a power element type supported at its one end centrally of said element plate and with the opposite end thereof bearing against a saddle member having connection with said valve means for relative movement with respect thereto, and said spring means including first and second springs one of which normally opposes relative movement between said saddle member and said piston valve and the other of which resiliently opposes axial movement of said piston valve in one direction.

11. A mixing valve of the class described for intermixing fluids of dissimilar temperature, comprising, a main valve body, first and second annular concentrically related chambers carrying first and second fluids respectively, a central third chamber coaxial with said first and second chambers, a first fluid inlet at one end of said valve body, a second fluid inlet at the same end of said valve body and communicating with said second annular chamber, piston valve means in said central chamber, an element plate overlying said first, second and central chambers and serving to isolate said first and second chambers from one another, said element plate forming a first seat for cooperation with one end of said piston valve means, a first passageway means between said second and central chambers, the control of fluid through said first passageway means being accomplished by the movement of said piston valve with respect to said first seat, a second seat for said piston valve means at the end thereof opposite to said first seat and formed by a wall portion of said valve body, a second passageway means from the first fluid inlet to said central chamber with the passage of fluid through said second passageway means being controlled by movement of said piston valve means relative to said second seat, thermostatic means for controlling movement of said piston valve means in one direction, spring means opposing thermostatically imparted movement of said piston valve, said thermostatic means and spring means respectively motivating said piston valve means toward said second and first seats, a mixing chamber disposed within said valve body adjacent said element plate and coaxial of said central chamber but on the opposite side of said element plate therefrom, port means communicating between said mixing chamber, and said central chamber, third passageway means communicating between said mixing chamber and said first annular chamber, third valve means controlling the passage of fluid through said third passageway means, and a discharge outlet means in said first annular chamber for the discharge of intermixed fluids from said valve body.

12. In a mixing valve of the class described, a hollow body having inlet means for each of two fluids to be mixed, a pair of concentric annular chambers formed in said body, each chamber communicating with one of said inlet means, a cylindrical third chamber located concentrically inward of said two annular chambers, first passageway means communicating between one of said annular chambers and said third chamber, second passageway means between the inlet means for the other annular chamber and said third chamber, a discharge outlet in said other annular chamber, a mixing chamber at one end of said third chamber communicating with the latter and said discharge outlet, a piston valve means mounted in said third chamber, thermostatic means for moving said piston valve means in one direction, and spring means opposing said thermostatic means and biasing said piston valve means in a second direction whereby the flow of the two fluids into said third chamber is regulated to achieve their intermixture in preselected proportions.

13. The combination as set forth in claim 12 in which pilot valve means are interposed between said one inlet means and said other annular chamber to control the flow of liquid into said chamber.

14. The combination as set forth in claim 12 in which said spring means comprises a first compressive spring in thrusting relation with said thermostatic means and a second compressive spring in thrusting relation with said piston valve means, the arrangement being such as to accommodate relative movement between said thermostatic and piston valve means.

15. The combination as set forth in claim 12 in which said spring means comprises a pair of compression coil springs, one spring surrounding said piston valve means and having its ends engaged with the same and a supporting surface to oppose movement of said piston valve means toward said second seat, the other of said springs opposing movement of said thermostatic means relative to said piston valve means and located within the peripheral limits of the latter to accommodate expansion of said thermostatic means after said piston is engaged with said second seat.

16. In a mixing valve of the class described, a hollow body having inlet means for each of two fluids to be mixed, a pair of concentric annular chambers formed in said body, each communicating with one of said inlet means, a cylindrical third chamber located concentrically inward of said two annular chambers, first passageway means communicating between one of said annular chambers and said third chamber, first valve seat means formed contiguous to said first passageway means at one end of said third chamber, second passageway means between the other annular chamber and said third chamber, second seat means formed contiguous to said second passageway means at the opposite end of said third chamber, a first valve means between said one annular chamber and the inlet means therefor, discharge means communicating with said third chamber, second valve means controlling the passage of fluids from said third chamber to said discharge means, third valve means in said third chamber for controlling the passage of said two fluids into said third chamber via said first and second passageway means, and thermostatic means responsive to the temperature of fluids in said third chamber for actuating said third named valve means.

17. The combination as set forth in claim 16 wherein such third valve means comprises two coil springs, each of said springs engaging respectively one of said seats, a hollow piston intermediate said two springs in said third chamber, and means interjoining said thermostatic means to said piston means whereby the latter means is movable axially along said third chamber in response to thermal motivation of said thermostatic means; the spacing between the coil springs of said third valve means providing a spiral orifice for the passage of fluid into said third chamber, such orifice being varied according to the movement of said piston means, 18. The combination as set forth in claim 16 in which said third valve means comprises a hollow piston, one end of which engages and seats with one of said seat means to control the flow of fluids through a contiguous one of said passageway means, spring means biasing said piston toward said one of said seat means, thermostatic means having connection with said piston means for biasing the same toward the other said seat means, said spring means being disposed intermediate said piston means and the other said seat means and extending across the other of said passageway means, the movement of said piston means toward the other said seat means serving to vary the spacing between the coils of said spring means thereby to valve and regulate the flow of fluids through the other said passageway means.

References Cited in the file of this patent

UNITED STATES PATENTS

| | | |
|---|---|---|
| 960,080 | Fay et al. | May 31, 1910 |
| 1,246,355 | Thomas | Nov. 13, 1917 |
| 2,159,033 | Leonard | May 23, 1939 |
| 2,245,171 | Wetzel | June 10, 1941 |
| 2,620,133 | Obermaier | Dec. 2, 1952 |